United States Patent [19]
Jacoby et al.

[11] Patent Number: 5,916,953
[45] Date of Patent: *Jun. 29, 1999

[54] STIFF, STRONG, TOUGH GLASS-FILLED OLEFIN POLYMER

[75] Inventors: Philip Jacoby, Marietta; Mark Allen Sherman, Suwanee, both of Ga.

[73] Assignee: BP Amoco Corporation, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,605

[22] Filed: Mar. 14, 1997

Related U.S. Application Data

[60] Provisional application No. 60/013,489, Mar. 15, 1996.

[51] Int. Cl.$^6$ .................................................. C08K 3/00
[52] U.S. Cl. .............................. 524/494; 525/70; 525/71; 525/74; 525/78
[58] Field of Search ................................. 525/70, 71, 74, 525/78; 524/494

[56] References Cited

U.S. PATENT DOCUMENTS

| | | | |
|---|---|---|---|
| 5,238,989 | 8/1993 | Takei et al. | 524/449 |
| 5,412,020 | 5/1995 | Yamamoto et al. | 524/505 |
| 5,602,203 | 2/1997 | Hamanaka et al. | 525/74 |

*Primary Examiner*—Edward J. Cain
*Attorney, Agent, or Firm*—Wallace L. Oliver

[57] ABSTRACT

A tough, strong, stiff glass-filled polyolefin composition comprises

- a propylene polymer having an nmr tacticity index of at least 94 and a molecular weight distribution of about 7 to 15;
- a stiffness-enhancing amount of glass fiber;
- an impact-modifying amount of a plastomer copolymer of ethylene with a $C_4$–$C_6$ alpha-olefin having a density of about 0.865 to about 0.910 g/cc; and
- a functionalized olefin polymer in a sufficient amount to act as a compatibility agent between polymeric materials and the glass fiber.

18 Claims, 1 Drawing Sheet

Fig. 1

STIFF, STRONG, TOUGH GLASS-FILLED OLEFIN POLYMER

CROSS REFERENCE TO RELATED APPLICATIONS

This application claims benefit under 35 USC 119(e) of U.S. Provisional Application No. 60/013,489, filed Mar. 15, 1996, incorporated by reference herein.

BACKGROUND OF THE INVENTION

This invention relates to strong, stiff, tough glass-filled olefin polymers and particularly to glass-filled blends of high crystalline, high tacticity, propylene polymers with plastomer ethylene-lower alkene copolymers, which are both tough and strong.

Glass-filled polyolefins, including high crystalline propylene polymers, are well known in the art and, typically, are produced to increase the strength or stiffness of the base polymer. However, a common trade-off for such increase in strength or stiffness is a loss of toughness and elongation at break. Toughness may be enhanced by incorporation of less crystalline or rubbery polymers into a glass-filled polymer blend. However, incorporation of such less crystalline or rubbery materials generally will decrease the stiffness and strength properties of the filled resin.

Glass-filled polypropylenes have advantageous properties such as high strength, stiffness, chemical resistance, low specific gravity, and low cost relative to typical glass-filled engineering resins. Possible applications of such glass-filled polypropylenes include appliances, hot water plumbing and irrigation systems, and automotive uses. A glass-filled high crystalline polypropylene has substantially increased strength and stiffness compared to conventional glass-filled isotactic polypropylenes. However, as noted above, such increase in stiffness or strength normally is at the expense of toughness or impact properties. An unblended high crystalline (high stiffness) polypropylene generally is more brittle and more notch sensitive than conventional polypropylene. A glass-filled high crystalline polypropylene also shows relatively poor impact and toughness properties. The need for a tough glass-filled polypropylene especially is desired for higher melt flow rate polymers which permit glass-filled polymers to be molded into large and complex parts.

Modification of polypropylene with plastomers has been described by Yu, Society of Plastics Engineers, Conference Proceedings, ANTEC 95 (1995), pp. 2374–2385. Cheng, Erderly, and Yu described plastomer and polypropylene blends for fiber and nonwoven applications in Society of Plastics Engineers, Conference Proceedings, ANTEC 95 (1995), pp. 2386–2392. Neither of these papers describe a glass-filled, high crystallinity polypropylene blended with a plastomer.

Hojabr and Boocock, Society of Plastics Engineers, Conference Proceedings, ANTEC 95 (1995), pp. 3620–3627, describe using polyolefin coupling agents in glass-filled polyolefins.

Glass-filled polyolefins, such as glass-filled polypropylenes, have been widely described. Use of a maleic acid- or anhydride-grafted polymer to improve adherence between a polypropylene and glass fiber is described in U.S. Pat. Nos. 4,599,385 and 4,673,210. Use of an organic peroxide to shorten molecular chains together with a modified polypropylene in a glass fiber-containing composition is described in U.S. Pat. No. 5,264,174. Modification of a polymer used in a glass-filled polypropylene using a unsaturated peroxide is shown in U.S. Pat. No. 5,447,985.

Incorporation of an ethylene-propylene copolymer in a glass fiber-containing composition is described in U.S. Pat. No. 4,983,647, while U.S. Pat. No. 4,621,115 describes use of a ethylene-propylene copolymer modified with itaconic anhydride in a glass-filled polypropylene. Inclusion of polymer reinforcing materials into a glass-filled polypropylene have been shown in U.S. Pat. No. 5,082,889 (polyethylene and an aromatic hydrocarbon resin); U.S. Pat. No. 5,030,682 (polybutene-1); U.S. Pat. No. 4,990,554 (ethylene-propylene random copolymer); U.S. Pat. No. 5,324,755 (styrenic polymer); U.S. Pat. No. 5,286,776 (styrenic hydrogenated block copolymer and a noncrystalline ethylene-$\alpha$-olefin copolymer); and U.S. Pat. No. 5,208,081 (rubber-like copolymer).

U.S. Pat. No. 5,238,989 describes a glass-filled polypropylene composition containing a modified polypropylene obtained by heating and melting a mixture of an unsaturated acid, an unsaturated silane and an organic peroxide to a crystalline polypropylene.

Use of silanes to size glass fibers in a glass-filled polypropylene have been described in U.S. Pat. Nos. 5,013,771, 5,300,547, 5,308,893, 5,376,701, and 5,437,928. High melt flow polypropylene used in a glass-filled polypropylene was shown in U.S. Pat. No. 4,997,875.

Polypropylenes having high tacticity have been described in U.S. Pat. No. 5,412,020 which have been blended with a block copolymer and a thermoplastic elastomer and may contain an inorganic filler.

U.S. Pat. No. 5,218,052 describes a high isotactic polypropylene having increased stiffness and a broadened molecular weight distribution.

There is a need for a glass-filled polypropylene which has a good balance between strength and toughness properties. The present invention combines a high crystalline (high isotacticity) propylene polymer with a broadened molecular weight distribution with a specified ethylene copolymer plastomer in a glass-filled product to produce a material which shows both good strength, stiffness, and toughness properties and satisfies commercial requirements for products. Such a product would be advantageous for many applications such as hot water plumbing, automotive instrument panels, electrical connectors, pump housings, valves, water tanks, sprinkler heads and the like.

SUMMARY OF THE INVENTION

A tough, strong, stiff glass-filled polyolefin composition comprises
  a propylene polymer having an nmr tacticity index of at least 94 and a molecular weight distribution of about 7 to 15;
  a stiffness-enhancing amount of glass fiber;
  an impact-modifying amount of a plastomer copolymer of ethylene with a $C_4$–$C_6$ alpha-olefin having a density of about 0.865 to about 0.910 g/cc; and
  a functionalized olefin polymer in a sufficient amount to act as a compatibility agent between polymeric materials and the glass fiber.

BRIEF DESCRIPTION OF THE INVENTION

Figure 1:
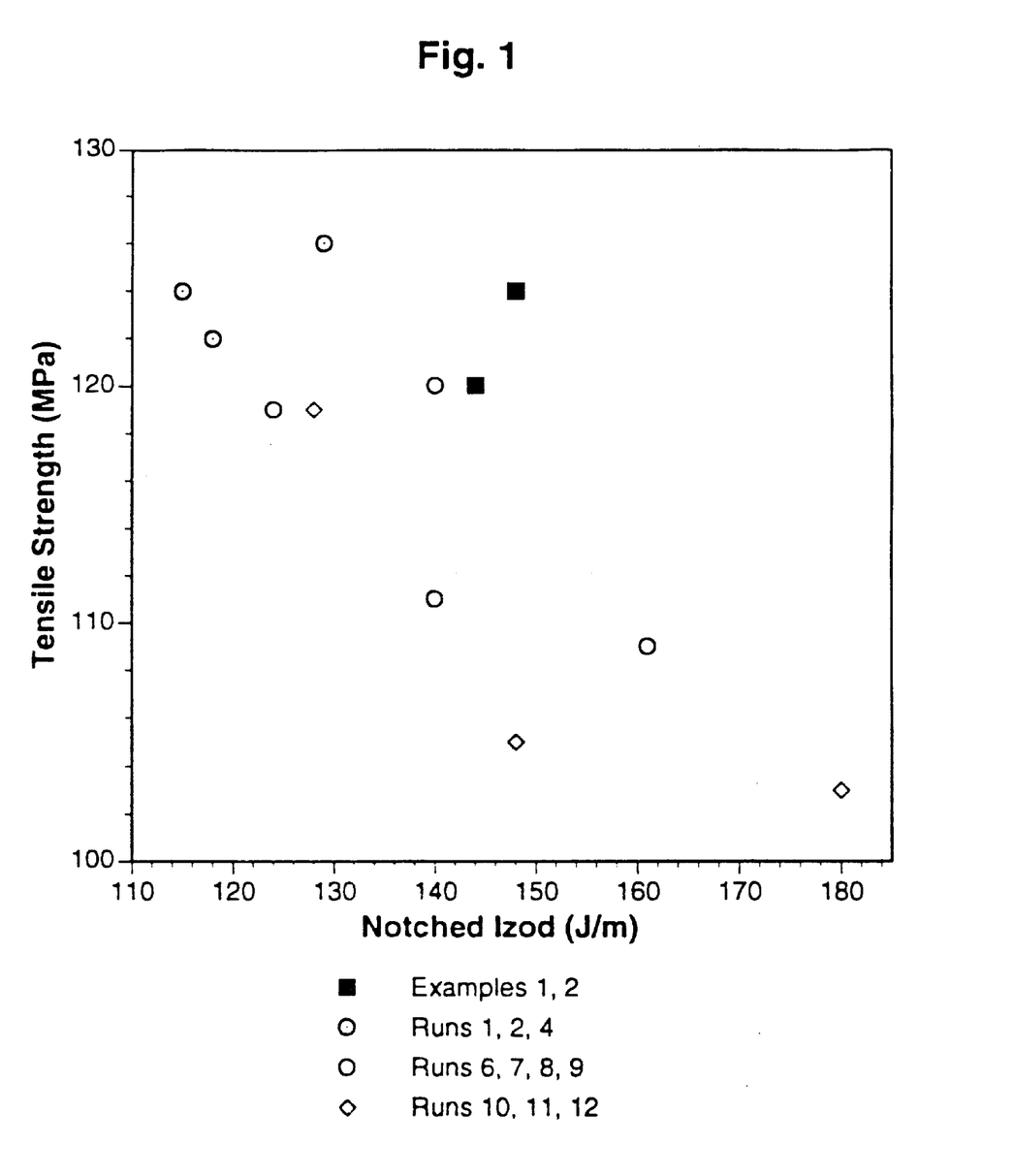
FIG. 1 is a plot of tensile strength versus Izod impact for glass-filled polypropylenes selected from Table I. The plot illustrates that products of this invention generally have distinct property characteristics from other glass-filled polypropylenes.

This invention relates to polymer-based materials which require a combination of high strength, stiffness, and impact properties. For example, in order to produce an effective material useful in hot water plumbing and other applications with similar requirements, a polymer material must possess a combination of properties. Stiffness and strength may be enhanced by filling a polymer with glass fiber. However, normally the impact properties of such a polymer will decrease with incorporation of glass fibers.

The glass-filled propylene polymers of this invention typically have a combination of strength and impact properties which are distinct from comparable materials not produced according to this invention. The polymer material, which forms the base of this invention, is a combination of a high tacticity, broad molecular weight distribution propylene polymer with a "plastomer" copolymer of ethylene with a $C_4$–$C_8$, preferably $C_4$–$C_6$, alpha-olefin which functions as an impact modifier. This combination, when formulated with glass fiber and a functionalized polypropylene compatibility agent, forms a material which satisfies the requirement of being both strong and impact resistant.

When formulated according to this invention, with about 40 wt. % glass fiber, glass-filled resins typically have a tensile strength (ASTM D638 at 23° C.) of at least 14.5 kpsi (100 MPa) and preferably at least 16 kpsi (110 MPa). As used to describe this invention, tensile strength is measured at a test rate of 0.2 inch/minute (5 mm/minute). In addition, the notched Izod impact strength (ASTM D256 at 23° C., ⅛-inch notched bar) typically is at least 2.5 ft-lb/inch (135 J/m) and preferably is at least 2.6 ft-lb/inch (140 J/m). The filled polymers of this invention also typically have melt flow rates of at least 2 g/10 minutes and preferably of at least 4 g/10, and particularly preferably at least 6 g/10 minutes, measured according to ASTM D1238 Condition L.

This invention relates to a compounded polymer blended product filled with an inorganic fiber, such as glass fiber. Such product has both high strength and high impact properties. The base polymer blend contains, as a significant component, a high crystalline propylene polymer and a "plastomer" copolymer of ethylene with a $C_4$–$C_8$, preferably $C_4$–$C_6$, alpha-olefin which functions as an impact modifier. The preferred plastomer copolymer is an ethylene-1-butene copolymer, and especially such a plastomer copolymer which has been produced using a metallocene-based catalyst system.

The polymer component of the composition of this invention primarily contains a high crystalline polymer of propylene. Polymers of propylene having substantial polypropylene crystallinity content now are well-known in the art. It has long been recognized that crystalline propylene polymers, described as "isotactic" polypropylene, contain crystalline domains interspersed with some non-crystalline domains. Noncrystallinity can be due to defects in the regular isotactic polymer chain which prevent perfect polymer crystal formation. The extent of polypropylene stereoregularity in a polymer can be measured by well-known techniques such as isotactic index, crystalline melting temperature, flexural modulus, and, recently by determining the relative percent of meso pentads (% m4) by carbon-13 nuclear magnetic resonance ($^{13}$C NMR).

The propylene polymer especially useful in this invention has both a high nmr tacticity and a broadened molecular weight distribution ("MWD") as measured by the ration of the weight average to number average molecular weights ($M_w/M_n$). Such molecular weights typically are measured by gel permeation chromatography (GPC) techniques known in the art.

As noted above, a method to determine stereoregularity of a propylene polymer uses $^{13}$C NMR and is based on the ability to identify relative positions of adjacent methyl groups on a polypropylene polymer backbone. If the methyl groups of two adjacent propylene monomer units (—CH($CH_3$)—$CH_2$—) are on the same side of the polymer chain, such two methyl groups form a meso ("m") dyad. The relative percentage of these meso dyads is expressed as % m. If the two methyl groups of adjacent monomer units are on opposite sides of the polymer chain, such two methyl groups form a racemic ("r") dyad, and the relative percentage of these racemic dyads is expressed as % r. Advances in $^{13}$C NMR techniques permit measurement of the relative positioning of three, four, and five successive methyl groups, which are referred to as triads, tetrads and pentads, respectively.

Current NMR instruments can quantify the specific distribution of pentads in a polymer sample. There are ten unique pentads which are possible in a propylene polymer:

A ball and stick representation of the mmmm pentad is:

Two of the possible pentads cannot be separated by NMR (mmrm and rmmr) and are reported together. Two of the ten pentads (mmrr and mrrm) result from the displacement of a single methyl group on the opposite side of the polymer chain in an isotactic sequence. Since the mmmm (m4) pentad represents a perfect isotactic stereoregular structure, measurement of this pentad (as % m4) reflects isotacticity and potential crystallinity. As used herein, the term nmr tacticity index is the percent of m4 (% m4) pentads as measured by $^{13}$C NMR. Thus, if 96% of pentads measured by $^{13}$C NMR in a propylene polymer are 4m, the nmr tacticity index is 96.

Previous general purpose propylene polymers typically have a nmr tacticity index up to about 92. Recently, high crystalline propylene polymers having nmr tacticity indices above about 94 are available. Preferable high crystalline propylene polymers useful in this invention have an nmr tacticity index in a range of about 95 to about 97 and higher. These high crystalline polypropylenes show enhanced flexural modulus and heat deflection temperatures. The flexural modulus of these materials, which have been nucleated, typically ranges from about 250 to about 400 kpsi (1700–2800 MPa) (ASTM D790) and preferably about 275 to 350 kpsi (1900–2400 MPa). Most preferably, the flexural modulus is at least 300 kpsi (2000 MPa). The flexural modulus for unnucleated materials generally is about 10% less than for nucleated materials. Heat deflection temperature (ASTM D648 at 66 psi (455 kPa)) typically ranges from about 235° to 285° F. (112°–140° C.) and preferably from about 250° to 275° F. (120°–135° C.). High crystalline propylene polymers useful in this invention typically have a MFR of about 1 to about 100, preferably about 5 to about 50, and most preferably about 10 to 40. Particularly useful high crystalline propylene polymers can be produced using the process described in U.S. Pat. No. 5,218,052, incorporated by reference herein. The high crystalline, broad molecular weight distribution polymers described in this patent are especially useful in this invention. The MWD of such polymers typically ranges from about 7 to about 15 and, preferably, is about 8 to about 12. A typical propylene polymer useful in this invention has an MWD of about 10.

The glass-filled product of this invention typically contains about 30 to about 90 wt % high crystalline propylene polymer and preferably contains about 35 to 85 wt % high crystalline propylene polymer. Most preferably, products of this invention contain about 40 to about 70 wt. % high tacticity propylene polymer.

The impact modifier used in the products of this invention is an olefin polymer plastomer which typically is a copolymer of ethylene with a $C_4$–$C_8$, preferably $C_4$–$C_6$, alpha olefin. Comonomers include 1-butene, 1-pentene, 4-methylpentene and 1-hexene. The preferable comonomer is 1-butene. A less preferable monomer is 1-octene. Plastomers of this invention also can contain minor amounts (<10 mole %) of a $C_4$–$C_{10}$ diolefin such as 1,4-hexadiene. Plastomers useful in this invention contain about 60 to about 99 mole percent ethylene and typically about 65 to about 95 mole percent ethylene. Suitable plastomers have a density ranging from about 0.910 to about 0.865 g/cc and a melt index of about 0.5 to 35 dg/min. and are characterized as having a narrow molecular weight distribution. Preferably, plastomers useful in this invention have densities from about 0.900 to about 0.870 with melt indices from about 0.8 to about 10. Advantageous plastomers have densities from about 0.885 to about 0.875 and melt indices from about 1 to about 5. Typical molecular weight distribution (MWD), as measured by Mw/Mn, range from about 1.5 to about 10 and preferably is about 1.8 to about 3.5. Most preferably, the MWD is about 2 to about 3. Typically, useful plastomers have an x-ray crystallinity above about 10%, preferably above about 20%, and a composition distribution breadth index (as defined in U.S. Pat. No. 5,246,783 incorporated by reference herein) above about 45%, preferably above about 60%, and more preferably above about 70%. Suitable plastomers may be produced using metallocene-based catalyst systems. A preferable plastomer useful in this invention is an ethylene-1-butene copolymer produced using a metallocene catalyst system such as U.S. Pat. No. 4,871,705 incorporated by reference herein. A particularly advantageous plastomer is Exxon Exact™ Grade 4041 which is an ethylene-1-hexene copolymer and has a melt index of 3.0 dg/min. and a density of 0.878 g/cc. Other suitable grades are Exact™ 3035 (M.I. 3.5; density 0.900), Exact™ 4042 (M.I. 1.1; density 0.899), and Exact™ 4033 M.I. 0.9; density 0.88).

The product of this invention contains an impact-modifying amount of a plastomer sufficient to increase toughness as measured by notched Izod and typically contains about 1 to about 20 wt % plastomer copolymer and preferably contains about 2 to 10 wt % plastomer copolymer. Most preferably, products of this invention contain about 3 to about 6 wt. % plastomer copolymer.

The product of this invention also includes a functionalized polymeric material, typically a functionalized propylene polymer, to provide adhesion between the high crystalline propylene polymer matrix and the glass fibers. Typically, these functionalized polymeric materials are graft copolymers of propylene polymers with a polar or ionic moiety such as maleic anhydride. The propylene polymer portion of the graft copolymer can be a homopolymer of propylene or a copolymer of propylene with another alpha-olefin such as ethylene. A homopolymer of propylene is preferred. Suitable functionalized propylene polymer is a maleated polypropylene with a maleation level of about 0.4 to about 2 wt. % (preferably 0.5–1.25 wt. %) and a MFR of about 15 to about 500 dg/min. (preferably 50–300). A particularly suitable maleated polypropylene is available under the tradename Fusabond™ from DuPont. Fusabond™ grade 109D is preferred which has a maleation level of 0.55 wt. % and an MFR of about 115. Another suitable functionalized propylene polymer is Polybond™ 3150 and Polybond™ 3200 from Uniroyal.

The funtionalized polymer is incorporated into the product of this invention in a sufficient amount to act as a compatibility agent between polymeric materials and the glass fiber. Typically, about 0.3 to about 12 wt % of funtionalized polymer is sufficient to provide adequate adhesion between the polymer matrix and the glass fibers. Since the funtionalized polymer is more expensive than the bulk high crystalline propylene polymer, there is an economic incentive to minimize the proportion of such funtionalized polymer in the total product. Preferably, such funtionalized polymer is incorporated into the product of this invention at a level of about 0.5 to 10 wt. % and most preferably at a level of about 1 to 6 wt. %. Products containing about 1.5 to 4 wt. % functionalized polymer, especially maleated polypropylene, were found to be especially suitable. Suitable high crystalline polypropylenes are available commercially from Amoco Chemical Company under the tradename ACCPRO®.

Included within the scope of the product of this invention is fuctionalizing all or a portion of the impact modifier used in the product. For example, the impact modifier used in this invention can be functionalized, such as maleated, and used for purposes of impact modification and compatibilization. In such a case the proportions of functionalized polymer would be included within the quantity of impact modifier.

Glass fibers used in this invention typically are chopped to a length of about ⅛ to ½ inch (3 to 13 mm), preferably ³⁄₁₆ to ⁵⁄₁₆ inch (5 to 8 mm) and, advantageously, are coated with a silane sizing agent. Particularly suitable glasses are Certainteed grades 910 and 96P. The diameters of typical glass fibers useful in this invention range from about 4 to about 25, preferably 5 to 15, micrometers ($\mu$m). The amount of glass fiber contained in the compositions of this invention is sufficient to increase stiffness of the other compounded product as measured by flexural modulus, and typically range from about 10 wt % to about 70 wt. % of the total glass-filled product. The mount of glass filling used in a product of this invention can vary depending upon the balance of properties desired with more glass loading producing a stiffer end material. For a suitable balance of toughness and stiffness incorporation of about 10 to 60 wt. % is preferred and more preferably about 25 to 50 wt %. A composition with about 40 wt % glass filling was found to be particularly advantageous in obtaining a balance between strength, as measured by tensile properties, and toughness as measured by impact.

For good results the components of the resin material, as based on the amount of resin, typically are about 1 to about 98 wt. %, preferably about 50 to about 95 wt. % and more preferably about 80 to about 90 wt. %, high tacticity propylene polymer; about 2 to about 20 wt. %, preferably about 4 to about 15 wt. % and more preferably about 5 to about 10 wt. %, plastomer; and about 1 to about 15 wt. %, preferably about 2 to about 10 and more preferably about 3 to about 8 wt. %, functionalized polymer.

The product of this invention is produced by blending (compounding) the individual components which is typically performed in a single- or twin-screw extruder as known by persons skilled in the art. The equipment and compounding conditions should be chosen by those skilled in the art to insure that the components are well mixed and that the glass fiber is dispersed uniformly and wetted by the propylene polymer matrix. Care should be taken not to reduce substantially the glass fiber length during blending or compounding. Typically, all of the components are blended together in an extruder, although the blending may be performed in stages. A non-limiting example would be blending the impact modifier with the functionalized polymer and then, in a separate operation, blending the resulting material with the high crystalline polypropylene and glass fiber.

Although the compounded product of this invention uses relatively short glass fibers, the strength and impact properties approach long-fiber polypropylene materials formed by pultrusion techniques, but at a significantly lower cost.

The product of this invention also typically contains minor amounts of additives such as antioxidants, uv-stabilizers, thermal stabilizers, colorants, and the like, as known to persons skilled in the art. Preferably, a minor amount of a crystallization nucleating agent, such as sodium benzoate, is added to enhance stiffness.

Inventions described herein are illustrated, but not limited, by the following examples.

EXAMPLES I–XXVIII

Comparative Runs 1–25

A series of products was prepared to illustrate this invention.

The base resins used for this series were selected from high crystalline (high tacticity) propylene polymers ("PP") with both broadened and conventional molecular weight distributions. Those with both high tacticity and broadened molecular weight distributions are identified as Amoco ACCPRO® PP resins.

In the tables, propylene polymer identified as Amoco ACCPRO® 1915 was made from a powder with a melt flow rate (MFR) of 12 which had been peroxide treated (by controlled rheology) to 35 MFR pellets and contained, as a stabilization additive package, 0.45 wt. % DSTDP, 0.20 wt. % Irganox 1010, 0.12 wt. % Irgafos 168, and 0.14 wt. % sodium benzoate. This base high crystalline polypropylene had an NMR tacticity of 95.8, a Mw/Mn of 12.4 a density of 0.91 g/cc, a heat deflection temperature of 275° F. (135° C.), a flexural modulus of 325 kpsi (2240 mPa), a tensile strength at yield of 6000 psi (41 mPa), and a notched Izod of 0.4 ft-lb/in (21 J/m).

Other ACCPRO® have the following properties

| ACCPRO ® PP | 9119 | 9346 | 9433 | 9934 |
|---|---|---|---|---|
| MFR, g/10 min. | 2 | 5 | 12 | 35 |
| Flexural Modulus, kpsi (MPa) | 310 (2140) | 320 (2210) | 350 (2410) | 325 (2240) |
| Heat Deflection, ° F. (° C.) | 255 (124) | 260 (127) | 270 (132) | 275 (135) |
| Tensile Strength, psi(MPa) | 6000 (41) | 6100 (42) | 6100 (42) | 6000 (41) |
| Elongation at break % | 80 | 26 | 10 | 9 |
| Izod Impact, ft-lb/in (KJ/m$^2$) | 0.6 (3) | 0.4 (2) | 0.4 (2) | 0.4 (2) |
| NMR Tacticity Index | 95.4 | 95.7 | 96.1 | 96.1 |
| Mw/Mn | 8 | 10 | 11 | 9 |

Pellet blends of the propylene polymer together with a maleated polypropylene (e.g., DuPont Fusabond™ 109D) and selected impact modifiers were fed into the main hopper of a ZSK-30 twin screw extruder, and 3/16 inch (5 mm) glass fiber (Certainteed™ 96P) was fed downstream. In the extruder, the highest zone temperature was 450° F. (232° C.) with an injection velocity of 1 inch/sec (2.5 cm/sec), a 20 second cure time, and a 120° F. (49° C.) mold temperature. All samples were molded and tested for tensile properties (including tensile strength and modulus) and notched Izod impact (with the Izod bars cut from the center of the tensile specimens).

In Table I, except as noted the propylene polymer (PP) was made from ACCPRO® 1915 powder as described above.

Results are shown in Tables I–III

TABLE 1

| | Examples (Runs) | | | | | | |
|---|---|---|---|---|---|---|---|
| | I | II | (1) | (2) | (3) | (4) | (5) |
| PP wt. % | 53 | 51 | 57 | 58.2 | 55.8 | 66.5 | none |
| Glass Fiber wt. % | 40 | 40 | 40 | 40 | 40 | 30 | 40 |
| Func. PP[1] wt. % | 3 | 4 | 3 | 1.8 | 4.2 | 3.5 | 3 |
| Impact Modifier (wt. %) | Exact[7] (4) | Exact[7] (5) | none | none | none | none | ICP[8] (57) |
| Tensile Strength[2] kpsi(MPa) | 18.0 (124) | 17.4 (120) | 18.0 (124) | 17.7 (122) | 18.3 (126) | 16.2 (112) | 12.6 (87) |
| Tensile Modulus[3] kpsi(MPa) | 1410 (9720) | 1420 (9790) | 1430 (9860) | 1410 (9720) | 1390 (9580) | 1080 (7450) | 1000 (6900) |
| Elongation[5] | 2.97 | 3.00 | 2.52 | 2.47 | 2.71 | 2.91 | 4.83 |
| Izod[6] ft-lb/in.(J/m) | 2.78 (148) | 2.70 (144) | 2.15 (115) | 2.21 (118) | 2.42 (129) | 2.03 (108) | 4.45 (238) |

TABLE 1-continued

| | Examples (Runs) | | | | | | |
|---|---|---|---|---|---|---|---|
| | (6) | (7) | (8) | (9) | (10) | (11) | (12) |
| PP wt. % | 34.2 | 45.6 | 48.5 | none | 53 | 48.5 | 53[12] |
| Glass Fiber wt. % | 40 | 40 | 40 | 40 | 40 | 40 | 40 |
| Func. PP[1] wt. % | 3 | 3 | 3 | 3 | 3 | 3 | 3 |
| Impact Modifier (wt. %) | ICP[8] (22.8) | ICP[8] (11.4) | TPO[9] (8.5) | ICP[10] (57) | Engage[11] (4) | Engage[11] (8.5) | Engage[11] (4) |
| Tensile Strength[2] kpsi(MPa) | 16.1 (111) | 17.2 (119) | 17.4 (120) | 15.8 (109) | 17.3 (119) | 15.2 (105) | 5.0 (103) |
| Tensile Modulus[3] kpsi(MPa) | 1310 (9030) | 1380 (9510) | 1370 (9450) | 1220 (8410) | 1460 (10070) | 1300 (8960) | 1280 (8830) |
| Elongation[5] | 2.96 | 2.69 | 2.84 | 3.29 | 2.66 | 3.08 | 3.45 |
| Izod[6] ft-lb/in.(J/m) | 2.63 (140) | 2.32 (124) | 2.62 (140) | 3.01 (161) | 2.40 (128) | 2.77 (148) | 3.38 (180) |

[1]Functionalized polypropylene = DuPont Fusabond ™ 109D
[2]Tensile Strength ASTM D638 at 23° C.
[3]Tensile Modulus ASTM D638 at 23° C.
[4]Flexural Modulus ASTM D790A at 23° C.
[5]Elongation at break D638 at 23° C.
[6]Notched (1/8 in.) Izod (23° C.) ASTM D256
[7]Exact ™ 4041 - Exxon Chemical Co.
[8]Amoco ACCTUF ® 3541 impact propylene-ethylene copolymer (11.9 wt % ethylene)
[9]Impact propylene-ethylene copolymer (25 wt % ethylene)
[10]Impact propylene-ethylene copolymer (3.3 wt % ethylene)
[11]Engage ™ 8150 - Dow Chemical Co.; M.I. 0.8, density 0.868; ethylene-octene copolymer
[12]Amoco ACCPRO ® 9119

TABLE II

| | Examples (Runs) | | | | | | |
|---|---|---|---|---|---|---|---|
| | III | IV | V | VI | VII | VIII | IX |
| PP[1] wt. % | 51[7] | 61[7] | 51[8] | 61[8] | 51[9] | 61[10] | 52.5 |
| Glass Fiber wt. % | 40 | 30 | 40 | 30 | 40 | 30 | 40 |
| Func. PP wt. % | 4.0[11] | 4.0[11] | 4.0[11] | 4.0[11] | 4.0[11] | 4.0[11] | 2.5[11] |
| Impact Modifier (wt. %) | Exact[12] (5) | Exact[12] (5) | Exact[12] (5) | Exact[12] (5) | Exact[12] (5) | Exact[12] (5) | Exact[12] (5) |
| MFR g/min. | 2.7 | 2.7 | 3.3 | 3.9 | 6.3 | 8.0 | 5.5 |
| Tensile Strength[2] kpsi(MPa) | 14.1 (97) | 13.2 (91) | 14.9 (103) | 13.9 (96) | 15.8 (109) | 13.9 (96) | 16.2 (112) |
| Tensile Modulus[3] kpsi(MPa) | 1380 (9520) | 985 (6790) | 1380 (9520) | 1030 (7100) | 1420 (9790) | 1040 (7170) | 1380 (9520) |
| Flexural Modulus[4] kpsi(MPa) | 1080 (7450) | 750 (5170) | 1130 (7790) | 820 (5650) | 1160 (8000) | 810 (5580) | 1200 (8270) |
| Elongation[5] | 2.70 | 3.00 | 2.40 | 2.50 | 2.70 | 3.00 | 2.80 |
| Izod[6] ft-lb/in.(J/m) | 2.60 (139) | 2.85 (152) | 2.23 (119) | 2.47 (132) | 2.58 (138) | 2.69 (144) | 2.58 (138) |

| | Examples (Runs) | | | |
|---|---|---|---|---|
| | (14) | (15) | (16) | (17) |
| PP[1] wt. % | 66[10] | 51 | 51 | 56 |
| Glass Fiber wt. % | 30 | 40 | 40 | 40 |
| Func. PP wt. % | 4.0[7] | 4.0[7] | — | 4.0[7] |
| Impact | | Engage[14] | Nylon 6,6[15] | |

TABLE II-continued

| Modifier (wt. %) | | () | () | |
|---|---|---|---|---|
| MFR g/min. | 10.3 | 6.2 | 5.7 | 12.9 |
| Tensile Strength[2] kpsi(MPa) | 10.1 (70) | 16.0 (110) | 15.2 (125) | 15.4 (106) |
| Tensile Modulus[3] kpsi(MPa) | 840 (5.79) | 1380 (9.52) | 1450 (10.00) | 1470 (10.14) |
| Flexural Modulus[4] kpsi(MPa) | 650 (4480) | 1190 (8200) | 1290 (8890) | 1220 (8410) |
| Elongation[5] | 5.00 | 2.20 | 2.40 | 1.90 |
| Izod[6] ft-lb/in.(J/m) | 4.34 (232) | 2.36 (126) | 2.24 (120) | 1.72 (92) |

[1] ACCPRO ® 9934 (unless otherwise noted)
[2] Tensile Strength ASTM D638 at 23° C.
[3] Tensile Modulus ASTM D638 at 23° C.
[4] Flexural Modulus ASTM D790A at 23° C.
[5] Elongation at break D638 at 23° C.
[6] Notched (1/8 in.) Izod (23° C.) ASTM D256
[7] Amoco ACCPRO ® 9346
[8] Amoco ACCPRO ® 9433
[9] Amoco ACCPRO ® 1915
[10] Amoco ACCPRO ® 3541 (20 MFR)
[11] Functionalized PP = DuPont Fusabond ™ 109D
[12] Exact ® 4041 - Exxon Chemical Co.

TABLE III

| | Examples (Runs) | | | | | | |
|---|---|---|---|---|---|---|---|
| | XVI | XVII | XVIII | XIX | XX | XXI | XXII |
| PP[1] wt. % | 52.5 | 51.75 | 51 | 52.5 | 51.75 | 51 | 53.25 |
| Glass Fiber wt. % | 40 | 40 | 40 | 40 | 40 | 40 | 40 |
| Func. PP wt. % | 2.5[8] | 3.25[8] | 4.0[8] | 2.5[9] | 3.25[9] | 4.0[9] | 1.75[10] |
| Impact Modifier (wt. %) | Exact[7] (5) | Exact[7] (5) | Exact[7] (5) | Exact[7] (5) | Exact[7] (5) | Exact[7] (5) | Exact[7] (5) |
| MFR g/min. | 5.7 | 6.2 | 4.9 | 6.7 | 7.6 | 6.6 | 6.9 |
| Tensile Strength[2] kpsi(MPa) | 16.3 (112) | 16.3 (112) | 15.9 (110) | 16.4 (113) | 16.2 (112) | 16.2 (112) | 16.3 (112) |
| Tensile Modulus[3] kpsi(MPa) | 1490 (10270) | 1450 (10000) | 1545 (10650) | 1280 (8830) | 1470 (10140) | 1440 (9930) | 1430 (9860) |
| Flexural Modulus[4] kpsi(MPa) | 1227 (8.46) | 1239 (8.54) | 1319 (9.09) | 1281 (8.83) | 1251 (8.63) | 1247 (8.60) | 1244 (8.58) |
| Elongation[5] | 3.00 | 2.90 | 2.70 | 2.70 | 2.90 | 2.97 | 2.97 |
| Izod[6] ft-lb/in.(J/m) | 2.68 (143) | 2.54 (136) | 2.51 (134) | 2.57 (137) | 2.73 (146) | 2.66 (142) | 2.75 (147) |

| | Examples (Runs) | | | | | |
|---|---|---|---|---|---|---|
| | XXIII | XXIV | (18) | XXV | (19) | (20) |
| PP[1] wt. % | 52.5 | 51.75 | 51 | 48.5 | 48.5 | 51 |
| Glass Fiber wt. % | 40 | 40 | 40 | 40 | 40 | 40 |
| Func. PP wt. % | 2.5[10] | 3.25[10] | 4.0[8] | 4.0[8] | 4.0[8] | 4.0[8] |
| Impact Modifier (wt. %) | Exact[7] (5) | Exact[7] (5) | Engage[11] (5) | Exact[7] (5) | Engage[11] (7.5) | Nylon 6,6[12] (5) |
| MFR g/min. | 5.8 | 7.8 | 5.3 | 5.0 | 4.6 | 6.1 |
| Tensile Strength[2] kpsi(MPa) | 16.2 (112) | 16.1 (111) | 15.0 (103) | 15.0 (103) | 13.4 (92) | 18.3 (126) |
| Tensile | 1450 | 1460 | 1440 | 1480 | 1235 | 1480 |

TABLE III-continued

| | | | | | | |
|---|---|---|---|---|---|---|
| Modulus[3] kpsi(MPa) | (10000) | (10070) | (9930) | (10200) | (8520) | (10200) |
| Flexural Modulus[4] kpsi(MPa) | 1254 (8.65) | 1285 (8.86) | 1192 (8.22) | 1232 (8.49) | 1235 (8.52) | 1476 (10.18) |
| Elongation[5] | 3.10 | 2.88 | 2.77 | 2.77 | 2.27 | 2.50 |
| Izod[6] ft-lb/in.(J/m) | 2.69 (144) | 2.62 (140) | 2.37 (126) | 2.54 (136) | 2.21 (118) | 2.29 (122) |

| | Examples (Runs) | | | | | |
|---|---|---|---|---|---|---|
| | XXVI | (21) | XXVII | (22) | (23) | XXVIII |
| PP[1] wt. % | 46 | 51 | 46 | 51[16] | 51[17] | 51[18] |
| Glass Fiber wt. % | 40 | 40 | 40 | 40 | 40 | 40 |
| Func. PP wt. % | 4.0[8] | 4.0[8] | 4.0[8] | 4.0[8] | 4.0[8] | 4.0[8] |
| Impact Modifier (wt. %) | Exact[13] (5) | Nylon 6[14] (5) | Exact[7] (5)[15] | Exact[7] (5) | Exact[7] (5) | Exact[7] (5) |
| MFR g/min. | 4.9 | 5.3 | 4.1 | 6.1 | 3.5 | 3.2 |
| Tensile Strength[2] kpsi(MPa) | 16.8 (116) | 18.1 (125) | 16.1 (111) | 14.5 (100) | 15.8 (109) | 13.4 (92) |
| Tensile Modulus[3] kpsi(MPa) | 1390 (9580) | 1710 (11790) | 1710 (11790) | 1590 (10960) | 1660 (11450) | 1660 (11450) |
| Flexural Modulus[4] kpsi(MPa) | 1389 (9.58) | 1394 (9.61) | 1283 (8.85) | 1213 (8.36) | 1297 (8.94) | 1250 (8.61) |
| Elongation[5] | 3.10 | 2.60 | 3.10 | 2.50 | 2.70 | 1.89 |
| Izod[6] ft-lb/in.(J/m) | 2.06 (110) | 2.29 (122) | 2.72 (145) | 2.24 (120) | 1.79 (96) | 2.61 (139) |

[1]ACCPRO ® 9934 (unless otherwise noted)
[2]Tensile Strength ASTM D638 23° C.
[3]Tensile Modulus ASTM D638 at 23° C.
[4]Elongation at break ASTM D638 at 23° C.
[5]Notched (1/8 in.) Izod (23° C.) ASTM D256
[6]Flexural Modulus ASTM D790A at 23° C.
[7]Exact ™ 4041 - Exxon Chemical Co.
[8]Functionalized PP = DuPont Fusabond ™ 109D
[9]Functionalized PP = Uniroyal Polybond ™ 3150
[10]Functionalized PP =Uniroyal Polybond ™ 3200
[11]Engage ™ 8150
[12]Zytel ™ 101 nylon 6,6 (5 wt. %)
[13]Includes 5 wt. % Zytel ™ 101 nylon 6,6
[14]Ultramid ™ B3S nylon 6 (5 wt. %)
[15]Includes 5 wt. % Ultramid ™ B3S nylon 6
[16]35MFR Polypropylene; NMR Tacticity Index = 96.5; Mw/Mn = 5.9
[17]Fina EOD 94-08; NMR Tacticity Index = 96.7; Mw/Mn = 5.8
[18]Amoco ACCPRO ® 9433

The data in Table I show that addition of an impact modifier improves toughness and reduces notch sensitivity of a glass-filled polymer product. However, this improvement generally was at the expense of strength and stiffness. This effect was observed for using impact copolymers. However, the products (Ex. I and II) which contained a ethylene/1-butene plastomer (Exact™ 4041) maintained both impact resistance and stiffness. Surprisingly, comparative runs (11, 12, and 13) with an ethylene/octene plastomer produced using a metallocene-based catalyst system (Engage™8150) did not maintain both stiffness and impact resistance properties. Thus, incorporating ethylene/1-butene plastomer into a glass-filled, high crystalline propylene polymer composition stands out from similarly-prepared products using other impact modifiers.

This trend is confirmed by the data shown in Tables II and III which show a superior balance of strength and impact properties for glass-filled products made according to this invention to comparable products not incorporating the specified plastomer or high tacticity polypropylene. The data in these table compare various polypropylene resins, functionalized polymer, and plastomer materials.

EXAMPLES XXIX–XXXII

Comparative Runs 24–26

Another series of examples and runs was performed in a manner similar to that described for Examples I–XXVIII, except that a polymer blend was prepared in a larger-scale ZSK-40 screw extruder. In each sample, 0.45 wt. % DSTDP and 0.2 wt. % Irganox 1010 blended with 2.35 wt. % ACCPRO® 1915 powder was incorporated into the neat polymer sample.

The results are shown in Table IV. The reported weight percent of polymer, functionalized PP, impact modifier and additives are based on the composition of the neat resin before compounding with glass fiber.

TABLE IV

| | Examples (Runs) | | | | | | |
|---|---|---|---|---|---|---|---|
| | XXIX | XXX | XXXI | XXXII | (24) | (25) | (26) |
| PP[1] wt. % | 84.1 | 85.8 | 86.0 | 87.4 | 92.4 | 92.4[9] | 93.1 |
| Glass Fiber wt. % | 40 | 40 | 30 | 30 | 40 | 40 | 30 |
| Func. PP wt. % | 4.6[7] | 2.9[8] | 3.9[7] | 2.5[8] | 4.6[7] | 4.6[7] | 3.9[7] |
| Impact Modifier (wt. %) | Exact[10] (8.3) | Exact[10] (8.3) | Exact[10] (8.3) | Exact[10] (8.3) | — | — | — |
| MFR g/min. | 5.0 | 4.8 | 5.0 | 6.4 | 4.6 | 4.8 | 5.6 |
| Tensile Strength[2] kpsi(MPa) | 16.4 (113) | 16.4 (113) | 14.3 (99) | 14.7 (101) | 17.9 (123) | 16.1 (111) | 15.5 (107) |
| Tensile Modulus[3] kpsi(MPa) | 1478 (10190) | 1413 (9740) | 1064 (7340) | 1075 (7410) | 1519 (10470) | 1423 (9810) | 1111 (7660) |
| Flexural Modulus[4] kpsi(MPa) | 1178 (8122) | 1149 (7922) | 812 (5598) | 832 (5737) | 1243 (8570) | 1117 (7702) | 885 (6102) |
| Elongation[5] | 3.2 | 3.1 | 3.3 | 3.1 | 2.7 | 3.2 | 3.1 |
| Izod[6] ft-lb/in.(J/m) | 2.91 (155) | 2.94 (157) | 2.70 (144) | 2.75 (148) | 2.56 (137) | 2.70 (144) | 2.48 (132) |

[1]ACCPRO ® 9934 (unless otherwise noted)
[2]Tensile Strength ASTM D638 at 23° C.
[3]Tensile Modulus ASTM D638 at 23° C.
[4]Elongation at break ASTM D638 at 23° C.
[5]Notched (1/8 in.) Izod (23° C.) ASTM D256
[6]Flexural Modulus ASTM D790A at 23° C.
[7]Functionalized PP = DuPont Fusabond ™ 109D
[8]Functionalized PP = Uniroyal Polybond ™ 3200
[9]Amoco 7634 homopolymer PP (Tensile strength = 5693 psi (39.3 MPa); Notched Izod = 0.46 ft-lb/in (25 J/m2); MFR = 21.9 g/10 min.)
[10]Exact ™ 4041 - Exxon Chemical Co.

EXAMPLES XXXIII–XXXIV

Two examples of the invention were prepared in a ZSK-40 screw extruder with 30 and 40 wt. % glass fiber in a manner similar to that described for Examples XXVII–XXXII. The data are shown in Table V.

TABLE V

| Examples (Runs) | XXXIII | XXXIV |
|---|---|---|
| PP[1] wt. % | 62.3 | 51 |
| Glass Fiber wt. % | 30 | 40 |
| Func. PP wt. % | 3.9 | 4.0 |
| Impact Modifier (wt. %) | 4.8 | 5.0 |
| MFR g/min. | 8 | 6 |
| Tensile Strength[2] kpsi(MPa) | 14.8 | 16.1 |
| Tensile Modulus[3] kpsi(MPa) | 1100 | 1500 |
| Flexural Modulus[4] kpsi(MPa) | 800 | 1120 |
| Elongation[5] | 3.0 | 2.9 |
| Izod[6] ft-lb/in.(J/m) | 2.8 | 3.1 |

[1]ACCPRO ® 9934
[2]Tensile Strength ASTM D638 at 23° C.
[3]Tensile Modulus ASTM D638 at 23° C.

TABLE V-continued

| Examples (Runs) | XXXIII | XXXIV |
|---|---|---|

[4]Elongation at break ASTM D638 at 23° C.
[5]Notched (1/8 in.) Izod (23° C.) ASTM D256
[6]Flexural Modulus ASTM D790A at 23° C.
[7]Functionalized PP = DuPont Fusabond ™ 109D
[10]Exact ™ 4041 - Exxon Chemical Co.

What is claimed is:

1. A tough, stiff, strong glass-filled polyolefin blended composition comprising:
    a propylene polymer having an nmr tacticity index of at least 94 and a molecular weight distribution of about 7 to 15;
    a stiffness-enhancing amount of glass fiber;
    an impact-modifying amount of a plastomer copolymer of ethylene with a $C_4$–$C_8$ alpha olefin having a density of about 0.865 to about 0.910 and a melt index of about 0.5 to 35 dg/min.; and
    a functionalized olefin polymer in a sufficient amount to act as a compatibility agent between polymeric materials and the glass fiber.

2. The glass-filled polyolefin composition of claim 1 wherein the copolymer is a copolymer of ethylene and a $C_4$–$C_6$ alpha olefin.

3. The glass-filled polyolefin composition of claim 1 wherein the copolymer is a copolymer of ethylene and 1-butene.

4. The glass-filled polyolefin composition of claim 1 wherein the functionalized olefin polymer is maleated polypropylene.

5. The glass-filled polyolefin composition of claim 1 which contains about 30 to about 90 wt. % propylene polymer.

6. The glass-filled polyolefin composition of claim 1 which contains about 10 to about 70 wt. % glass fiber.

7. The glass-filled polyolefin composition of claim 1 which contains about 1 to about 20 wt. % plastomer.

8. The glass-filled polyolefin composition of claim 1 which contains about 1 to about 10 wt. % functionalized olefin polymer.

9. The glass-filled polyolefin composition of claim 1 wherein the propylene polymer has an nmr tacticity index greater than 95.

10. The glass-filled polyolefin composition of claim 1 wherein the propylene polymer has an $M_w/M_n$ of about 8 to 12.

11. A tough, stiff, strong glass-filled polyolefin blended composition comprising:

about 30 to about 60 wt. % of a high crystalline propylene polymer having an nmr tacticity index in excess of 94 and an $M_w/M_n$ of about 7 to 15;

about 30 to about 50 wt. % of glass fiber;

about 2 to about 10 wt. % of a plastomer copolymer of ethylene with 1-butene having a density of about 0.87 to about 0.90 and a melt index of about 0.5 to 35 dg/min.; and about 2 to about 6 wt. % of a functionalized olefin polymer compatibility agent.

12. The glass-filled polyolefin composition of claim 1 having a tensile strength of at least 14.5 kpsi and a notched Izod impact strength of at least 2.5 ft-lb/inch.

13. The glass-filled polyolefin composition of claim 11 having a tensile strength of at least 14.5 kpsi and a notched Izod impact strength of at least 2.5 ft-lb/inch.

14. The glass-filled polyolefin composition of claim 11 having a tensile strength of at least 16 kpsi and a notched Izod impact strength of at least 2.6 ft-lb/inch.

15. The glass-filled polyolefin composition of claim 14 having a melt flow rate of at least 5 g/10 minutes measured according to ASTM D1238 Condition L.

16. The glass-filled polyolefin composition of claim 13 having a melt flow rate of at least 6 g/10 minutes measured according to ASTM D1238 Condition L.

17. The glass-filled polyolefin composition of claim 13 wherein the nmr tacticity index of the polyolefin is at least 95 and the $M_w/M_n$ of the polyolefin is about 8 to 12.

18. The glass-filled polyolefin composition of claim 10 having a tensile strength of at least 16 kpsi, a notched Izod impact strength of at least 2.6 ft-lb/inch, and a a melt flow rate of at least 6 g/10 minutes measured according to ASTM D1238 Condition L.

* * * * *

UNITED STATES PATENT AND TRADEMARK OFFICE
CERTIFICATE OF CORRECTION

PATENT NO. : 5,916,953                    Page 1 of 2
DATED : Jun. 29, 1999
INVENTOR(S) : Philip Jacoby, Mark Allen Sherman It is certified that error appears in the above-identified patent and that said Letters Patent is hereby corrected as shown below:

| Col. | Line | |
|---|---|---|
| 1 | 7,8 | "60/013,489, filed Mar. 15, 1996, incorporated by reference herein." |
| 6 | 44 | "mount of glass"<br><br>should read:<br>"amount of glass" |
| 11 | | "Tensile 10.1 16.0 15.2 15.4"<br><br>should read:<br>"Tensile 10.1 16.0 18.2 15.4" |

Col.    Line

The following table is missing entirely from the patent:

(It should be in column 11.)

TABLE II (continued)

| Examples (Runs) | X | XI | XII | XIII | XIV | XV | 13 |
|---|---|---|---|---|---|---|---|
| PP[1] wt.% | 51 | 52.5 | 51 | 52.5 | 51 | 52.5 | 56[10] |
| Glass Fiber wt.% | 40 | 40 | 40 | 40 | 40 | 40 | 40 |
| Func. PP wt.% | 4.0[8] | 2.5[8] | 4.0[9] | 2.5[9] | 4.0[10] | 2.5[10] | 4.0[7] |
| Impact Modifier (wt.%) | Exact[6] (5) | Exact[6] (5) | Exact[6] (5) | Exact[6] (5) | Exact[6] (5) | Exact[6] (5) | ---- |
| MFR g/min. | 6.8 | 6.1 | 6.6 | 6.2 | 6.4 | 7.1 | 8.6 |
| Tensile Strength[2] kpsi(MPa) | 15.7 (108) | 15.8 (109) | 16.1 (111) | 16.3 (112) | 15.9 (110) | 16.1 (111) | 10.9 (75) |
| Tensile Modulus[3] kpsi(MPa) | 1380 (9520) | 1340 (9240) | 1460 (10060) | 1430 (9860) | 1390 (9580) | 1440 (9930) | 1185 (8170) |

UNITED STATES PATENT AND TRADEMARK OFFICE
CERTIFICATE OF CORRECTION

PATENT NO. : 5,916,953
DATED : Jun. 29, 1999
INVENTOR(S) : Philip Jacoby, Mark Allen Sherman It is certified that error appears in the above-identified patent and that said Letters Patent is hereby corrected as shown below:

| Flexural Modulus[4] kpsi (MPa) | 1190 (8210) | 1160 (8000) | 1190 (8200) | 1180 (8140) | 1160 (8000) | 1160 (8000) | 870 (6000) |
|---|---|---|---|---|---|---|---|
| Elongation[5] | 2.20 | 2.20 | 2.60 | 2.40 | 2.40 | 2.60 | 5.60 |
| Izod[6] ft-lb/in.(J/m) | 2.29 (122) | 2.39 (128) | 2.64 (141) | 2.55 (136) | 2.54 (136) | 2.69 (144) | 4.64 (248) |

[13] Functionalized PP = Epolene G3003
[14] Functionalized PP=Uniroyal Polybond™3150
[15] Functionalized PP = Exxon PO 1015
[14] Functionalized PP=Uniroyal Polybond™3150
[15] Functionalized PP = Exxon PO 1015
[14] Engage™ 8150
[15] Zytel™ 101 (5 wt.%)

Signed and Sealed this

Eighteenth Day of January, 2000

Attest:

Q. TODD DICKINSON

Attesting Officer

Commissioner of Patents and Trademarks